(12) United States Patent
Thorsen (10) Patent No.: US 10,220,505 B2
(45) Date of Patent: Mar. 5, 2019

(54) CARRIER ATTACHMENT APPARATUS AND METHOD FOR A VEHICLE

(71) Applicant: Burro Creative Solutions, Alexandria, VA (US)

(72) Inventor: Robert Ladd Thorsen, Warrenton, VA (US)

(73) Assignee: Burro Creative Solutions, Alexandria, VA (US)

( * ) Notice: Subject to any disclaimer, the term of this patent is extended or adjusted under 35 U.S.C. 154(b) by 79 days.

(21) Appl. No.: 15/242,781

(22) Filed: Aug. 22, 2016

(65) Prior Publication Data

US 2017/0057079 A1 Mar. 2, 2017

Related U.S. Application Data

(60) Provisional application No. 62/209,069, filed on Aug. 24, 2015.

(51) Int. Cl.
| | |
|---|---|
| *B25H 5/00* | (2006.01) |
| *B62B 1/20* | (2006.01) |
| *B25H 3/06* | (2006.01) |

(52) U.S. Cl.
CPC ............ *B25H 5/00* (2013.01); *B25H 3/06* (2013.01); *B62B 1/20* (2013.01)

(58) Field of Classification Search
CPC ............... B25H 5/00; B25H 3/06; B62B 1/20
USPC ............................................................ 224/401
See application file for complete search history.

(56) References Cited

U.S. PATENT DOCUMENTS

| | | | | | |
|---|---|---|---|---|---|
| 3,418,005 | A | * | 12/1968 | Allina | B62B 1/08 280/47.26 |
| 4,521,030 | A | * | 6/1985 | Vance | B62B 1/12 280/42 |
| 4,708,274 | A | * | 11/1987 | Roche | A61H 3/00 108/44 |
| 5,318,315 | A | * | 6/1994 | White | B62B 1/10 280/47.18 |
| 5,415,421 | A | * | 5/1995 | Godwin | B62B 1/18 224/401 |
| 5,415,521 | A | * | 5/1995 | Hufnagel | F02M 37/048 415/55.1 |
| 5,687,979 | A | * | 11/1997 | Plevka | B62B 1/20 280/47.19 |
| D393,129 | S | * | 3/1998 | Yemini | D34/16 |
| 5,765,868 | A | * | 6/1998 | Ventrone | B62B 3/02 220/482 |

(Continued)

*Primary Examiner* — Peter Helvey
(74) *Attorney, Agent, or Firm* — Maier & Maier, PLLC (57) ABSTRACT

According to at least one exemplary embodiment, a carrier may be overlaid onto a vehicle. The vehicle may be a handle-propelled vehicle, for example a wheelbarrow. The carrier may have contours that fit over the top of the vehicle such that the carrier stays in place relative to the vehicle without additional fastening means when the vehicle is propelled in motion. The carrier design may also allow the carrier to be easily installed and removed from the vehicle. Additionally, the carrier may have a plurality of compartments of varying sizes and shapes. The compartments may be specifically designed to hold a variety of items, for example mobile technology devices, food containers, beverage containers, gardening materials and tools, landscaping materials and tools, or construction materials and tools.

19 Claims, 13 Drawing Sheets

(56) References Cited

U.S. PATENT DOCUMENTS

| | | | | |
|---|---|---|---|---|
| 5,915,572 | A * | 6/1999 | Hancock | A47B 81/005 211/64 |
| 5,957,352 | A * | 9/1999 | Gares | B25H 3/04 224/401 |
| 6,193,265 | B1 * | 2/2001 | Yemini | B60B 37/10 280/47.31 |
| 6,547,309 | B1 * | 4/2003 | Franklin | B62B 1/20 280/47.31 |
| 6,964,421 | B2 * | 11/2005 | Friel | B62B 1/20 280/47.31 |
| D732,785 | S * | 6/2015 | Thorsen | D34/27 |
| 2002/0117818 | A1 * | 8/2002 | Barnes | A01K 5/00 280/47.26 |
| 2004/0217238 | A1 * | 11/2004 | Chochinov | B25H 3/06 248/99 |
| 2005/0040615 | A1 * | 2/2005 | Frommherz | B62B 3/1468 280/33.992 |
| 2005/0212238 | A1 * | 9/2005 | Conley | B25H 1/04 280/47.32 |
| 2005/0280227 | A1 * | 12/2005 | Murphy | B62B 1/20 280/47.31 |
| 2007/0039986 | A1 * | 2/2007 | Tomasi | B25H 3/04 224/401 |
| 2007/0164526 | A1 * | 7/2007 | Martini | B62B 1/16 280/47.26 |
| 2008/0185802 | A1 * | 8/2008 | Fleming | B62B 1/22 280/47.18 |
| 2009/0001088 | A1 * | 1/2009 | Lamendola | B65F 1/02 220/606 |
| 2010/0127028 | A1 * | 5/2010 | Lusk | B62B 1/20 224/401 |

* cited by examiner

CARRIER ATTACHMENT APPARATUS AND METHOD FOR A VEHICLE

BACKGROUND

Attachments for a handle-propelled vehicle that have sections to hold different tools are known. Some known attachments are coupled exclusively to the handles of the vehicle. These handle attachments provide limited holding sections. Additionally, known handle attachments are fastened to the handles such that installing and removing an attachment is a tedious, time-consuming task. Further, handle attachments lack capabilities for carrying larger, rod-type tools or objects.

Attachments for a handle-propelled vehicle that attach to a non-handle portion of the vehicle for carrying larger, rod-type tools or objects are known, however they exclusively provide only that single function. Additionally, non-handle attachments are fastened to the vehicle such that installing and removing an attachment is a tedious, time-consuming task or even impossible. Current products are not secure and may be difficult to attach and remove. Additionally, current products do not allow for secure carrying or transport of different sized items.

SUMMARY

According to at least one exemplary embodiment, a carrier may be overlaid onto a vehicle. The vehicle may be a handle-propelled vehicle, for example a wheelbarrow. The carrier may have contours that fit over the top of the vehicle such that the carrier stays in place relative to the vehicle without additional fastening means when the vehicle is propelled in motion. The carrier design may also allow the carrier to be easily installed and removed from the vehicle. Additionally, the carrier may have a number of compartments of varying sizes and shapes. The compartments may be specifically designed to securely hold a variety of items, for example mobile technology devices, food containers, beverage containers, gardening materials and tools, landscaping materials and tools, or construction materials and tools.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

According to some exemplary embodiments, and generally exemplary FIG. 1 to FIG. 13, a carrier 100 may be freely or securely attached to a vehicle 10, such as a wheelbarrow. The carrier 100 may have any number of compartments and securing members of varying sizes and shapes. The compartments may carry or hold a variety of items, including: mobile technology devices, such as cellular phones, smartphones, and tablet computers; everyday items, such as keys, key chains, and wallets; beverage containers, such as bottles and cans; food containers, such as lidded containers and plastic bags; raw gardening materials and bags or containers thereof, such as seeds, plants, fertilizers, and pesticides; landscaping materials and bags or containers thereof, such as stones, rocks, cement, sand, and soil; raw construction materials and bags or containers thereof, such as nails, screws, wire, wood, paint, and metal; and tools for gardening, landscaping or construction, such as hoes, spades, shovels, scoops, forks, rakes, claws hammers, drills, drivers, saws, axes, knives, shears, pruners, cutters, flashlights, brooms, mops, levels, measuring sticks, and measuring tapes. The carrier 100 may be made of a variety of materials including plastic, metal, rubber, wood, or other polymers. The carrier 100 may have a smooth surface or a substantially grainy surface, as desired.

Figure 1:
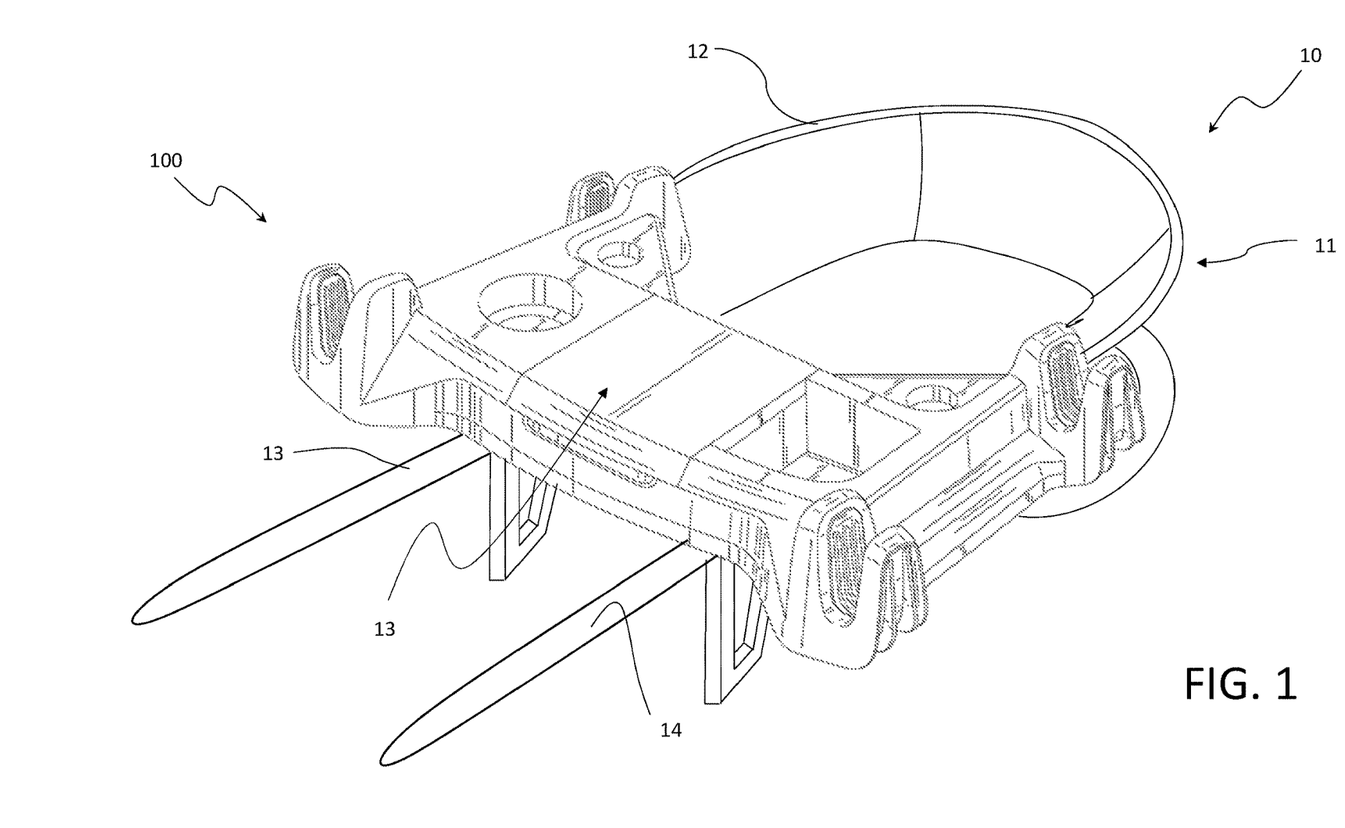
FIG. 1 is a top front perspective view of an exemplary embodiment of a carrier attachment for a vehicle with environment.
Figure 2:
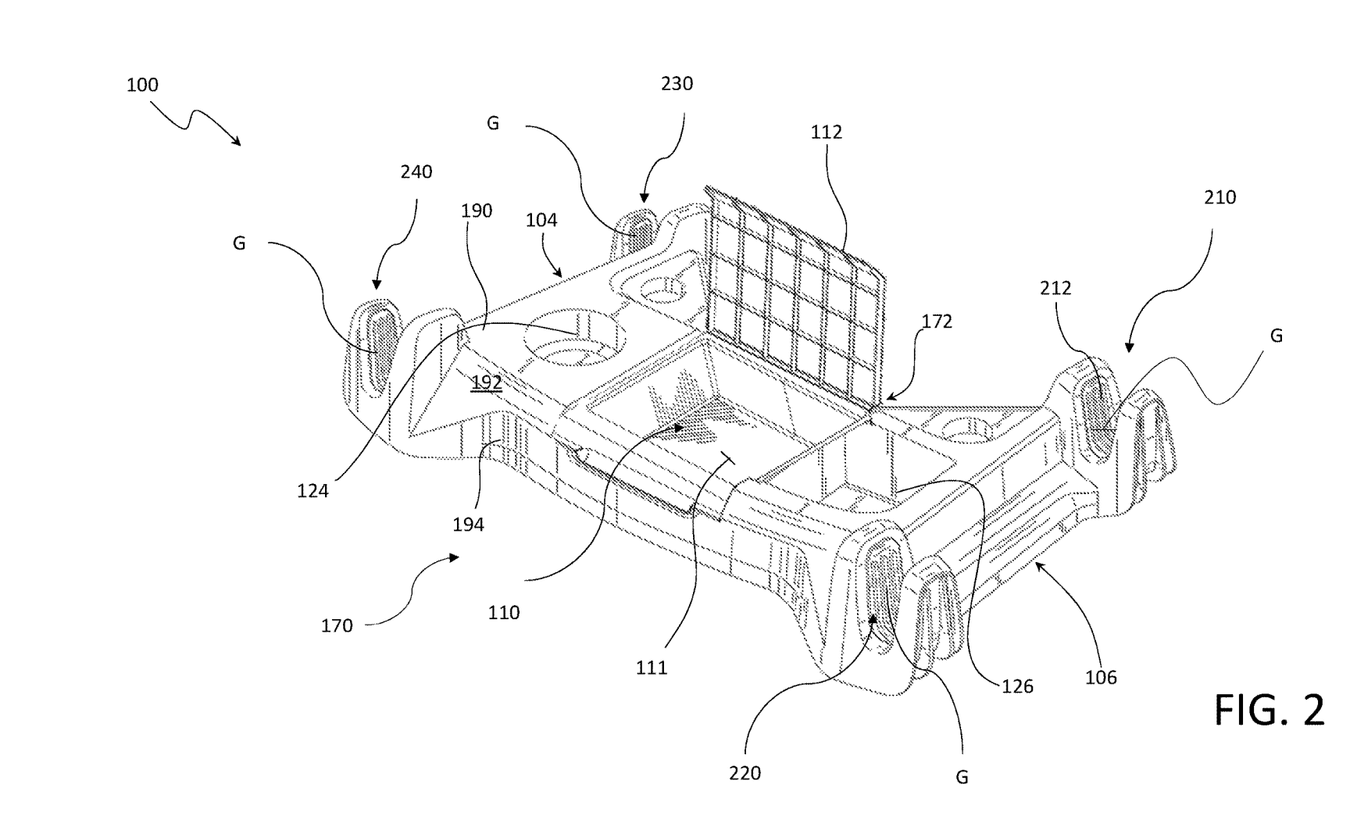
FIG. 2 is a front perspective view of an exemplary embodiment of a carrier attachment for a vehicle.
Figure 3:
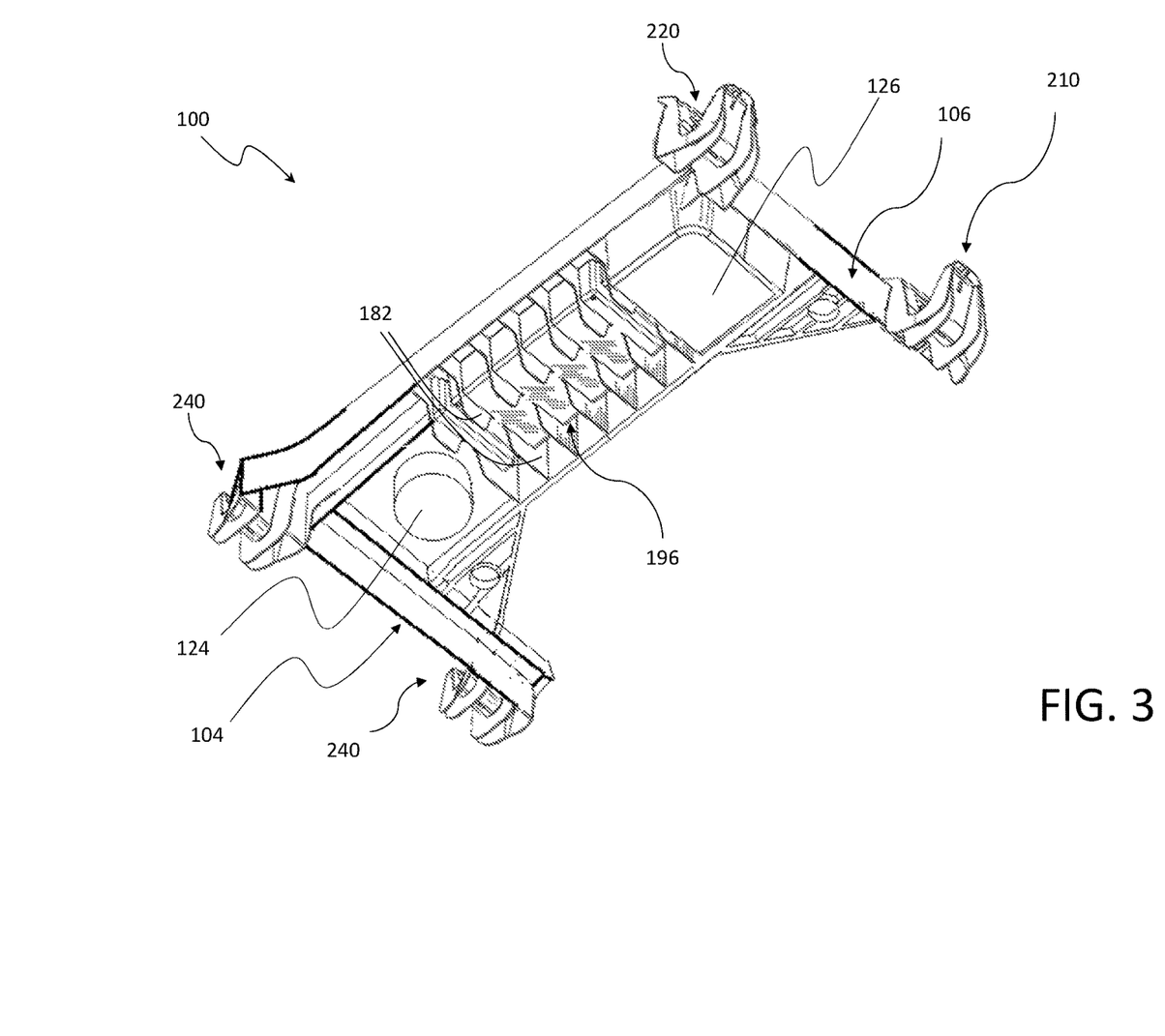
FIG. 3 is a bottom perspective view of an exemplary embodiment of a carrier attachment for a vehicle.

Now referring generally to exemplary FIG. 1 through FIG. 3, the carrier 100 may have any desired size or dimensions, depending on its desired application. It may be appreciated that the dimensions shown in exemplary FIG. 1 to FIG. 3 are merely exemplary and do not limit the scope of the carrier in any manner. Additionally, the carrier 100 may fit over the top of at least a portion of the vehicle 10. In an exemplary embodiment, the carrier 100 may fit over a portion of both tub and handles of a vehicle, such as a wheelbarrow, where the tub portion of the wheelbarrow remains substantially open or uncovered. For example, the carrier may fit over a rear end of the tub of a wheelbarrow such that substantially more of the tub remains open or uncovered than a portion of the tub that is covered by the carrier 100. Thus, gripping portions of a carrier 100 may be securely coupled to top or bottom portions of handles 13, 14 of a wheelbarrow, as well as a tub 11 of a wheelbarrow. The carrier 100 may have a top surface 190 and an outer side surface 194 with a top beveled edge 192. The carrier 100 may have a left side 104, a right side 106, a front side 170, a rear side 172, and an underside 196. In some exemplary embodiments, the carrier 100 may have rounded corners and an outwardly curving front side. The carrier may be configured substantially like a carrying tray and may include at least one carrying compartment or attachment member. In an exemplary embodiment, there may be a plurality of carrying compartments and attachment members. At least one of the carrying compartments may be substantially well-like. The compartments may have varying depths. The carrier 100 may be disposed such that it extends over the width of a tub 11 of a wheelbarrow or that it is disposed substantially behind the tub 11 of a wheelbarrow 10 between handles 13, 14 of a wheelbarrow 10. The carrier 100 may be affixed to vehicle 10 by resting on at least one of a rim 12 of tub 11 or handles 13, 14, or any combination thereof. In an exemplary embodiment, the carrier may rest on a rear portion and side portions of a rim 12. The carrier 100 may rest freely in place or may be secured in place through snap fitting, friction fitting, fasteners, bolts, screws, adhesive, and other securing capabilities as would be understood by a person having ordinary skill in the art. There may be securing portions 182 disposed on the underside 196 of the carrier 100. Referring to exemplary FIG. 3, the securing portions 182 may be configured to receive a rim 12 of a tub 11. Securing portions 182 may be disposed along perimeter side edges of the carrier 100. Securing portions 182 may additionally be disposed to cross laterally below carrier to receive a rear portion of a rim 12. The lateral securing portions may be disposed between compartment and sidewalls 104, 106. The location of securing portions 182 may vary depending on the desired orientation of the carrier 100. Exemplary securing portions may include rib-like flanges configured to form a receiving track for the rim 12 of tub. Securing portions 182 may be tapered or shaped to facilitate positioning on and receiving a rim 12. Rim 12 may fit freely within the receiving track or may be secured in the track through snap fitting, friction fitting, or other known securing configurations as would be reasonably understood by a person having ordinary skill in the art. In some embodiments, securing portions on the left side 104 and right side 106 may include the wall of the compartments and the shanks of the hook members.

The alignment of the securing portions 182 may allow the carrier 100 to fit over the top of the vehicle 10 such that the carrier 100 may remain in place relative to the vehicle 10 without additional fastening capabilities when the vehicle 10 is propelled in motion. This design may also allow the carrier 100 to be easily installed and removed from the vehicle. In some exemplary embodiments, to provide extra coupling security, the carrier 100 may be coupled to the vehicle 10 via any known fastening capabilities, for example clips, hooks, loops, hoops, screws, nuts and bolts, or adhesives.

Referring to exemplary FIGS. 1 through 3 generally, the carrier 100 may have at least one compartment configured for holding or securing objects to vehicle 10. These compartments may include at least one central compartment 110. At least one of the compartments may further have a lid for closing the compartment. In an exemplary embodiment, the central compartment 110 may include a lid 112 for closing the compartment 111. In some embodiments, the lid 112 may substantially prevent the contents of the sealed compartment from interacting with an external environment and may be generally sealed or provide water-tight or air-tight sealing, as desired. The carrier 100 further includes a compartment, such as a cup holder, that may be generally open to receive any desired object, any number of tool holders, such as short-handled tools, and any other compartments, as desired. In an exemplary embodiment, the carrier 100 may include a left rear compartment 124 and a right rear compartment 126. The left rear compartment 124 may be a single large cylindrical compartment. The right rear compartment 126 may be substantially rectangular. The depth of compartments can be various depending on tools mainly secured.

The carrier 100 may have at least one of hook members 210, 220, 230, 240 disposed there on. There may be two hook members 210, 220 disposed on the right side of the carrier 100 and two hook members 230, 240 disposed on the left side of the carrier 100. One hook member 210 on right side and one hook member 230 on left side of carrier 100 may be disposed proximate a front or middle portion of the carrier 100. One hook member 220 on the right and one hook member 240 on left side may be disposed proximate a rear side of carrier 100. Hook members 210, 220, 230, 240 may extend down and outward from the carrier 100. Hook members 210, 220, 230, 240 may be configured to hold elongated objects, such as poles or long handled tools, such as shoves, brooms, rakes, axes, etc. The gaps G of the hook member 210, 220, 230, 240 may be substantially V-shaped to hold a range of handle sizes or objects. In an exemplary embodiment, hook members 210, 220, 230, 240 may be substantially rigid and may have the elastomeric grip 212, 222, 232, 242 applied on the inner face of the V as a gripping or locking member. Hook members 210, 220, 230, 240 may also be used to attach buckets, hanging objects, towels, etc.

Referring now to exemplary FIGS. 4 to 7, the hook member 210 may include a base 211 and a locking portion 215. The base may include a first portion 211a, a second portion 211b, and a third portion 211c. One side of the first portion 211a may be connected with the right side 106 of the career 100. One end of second portion 211b is connected with one end of the first portion 211a and another end of second portion 211b is connected with one end of the third portion 211c such that the first portion 211a, the second portion 211b and the third portion 211c may form substantially V-shaped gap G. The third portion 211c may include an opening 219. The reference $\theta_1$ indicates an angle between the first portion 211a of the hook member 210 and the third portion 211c of the hook member 210.

The reference number 212 indicates the grip portion 212 disposed on hook member to securely hold objects. In an exemplary embodiment, the grip portion 212 of the hook member 210 may be a rubber or elastomeric grip disposed insides of the first portion 211a, the second portion 211b, and the third portion 211c. The grip portion 212 may be molded with ridges designed to conform and deform to an object disposed within the hook member 210, when pressed into the elastomeric material, creating a grip on the object. In some exemplary embodiments, the elastomeric material may be silicone rubber.

Figure 4:
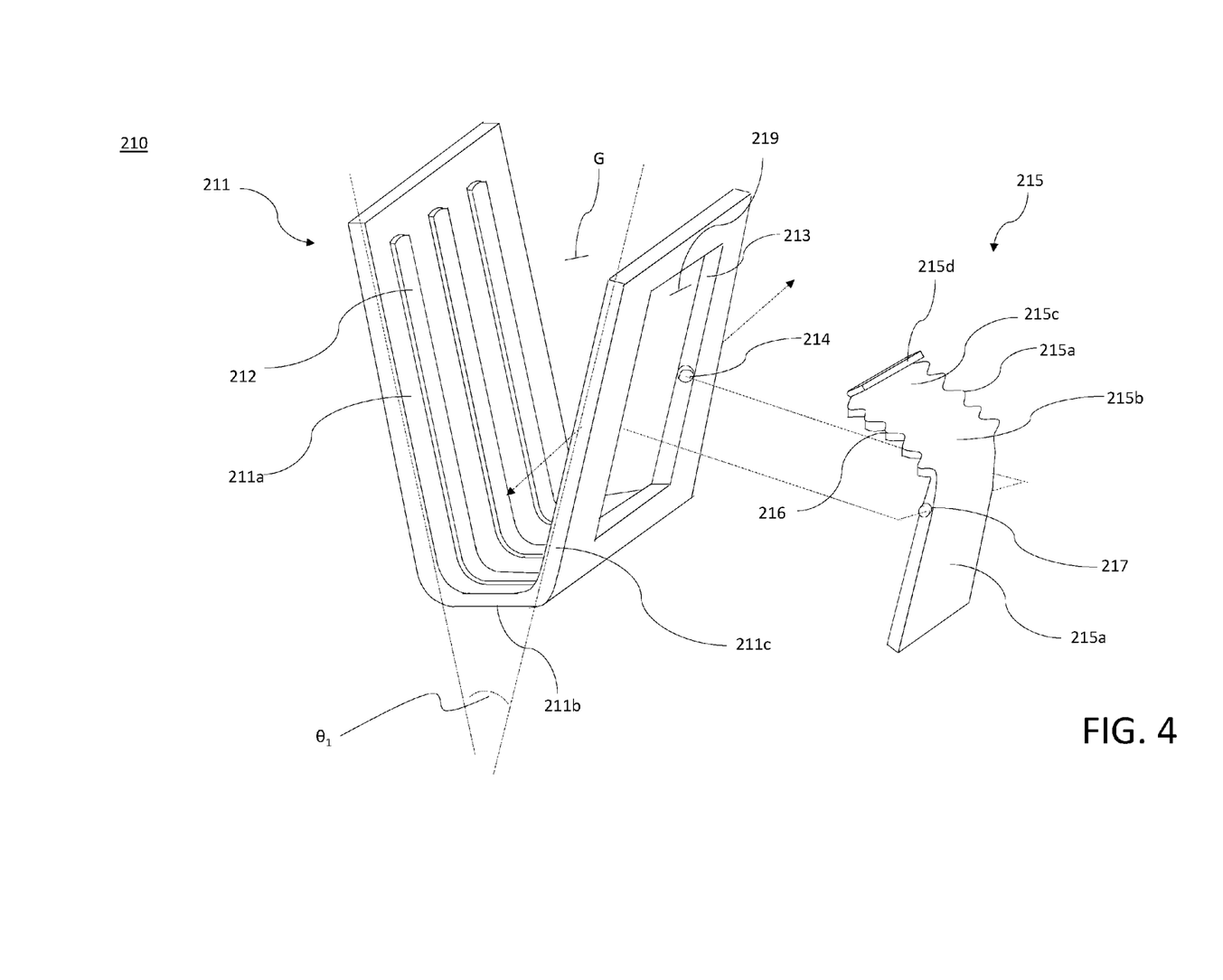
FIG. 4 is a detail view of a hook member of an exemplary embodiment of a carrier attachment.
Figure 5:
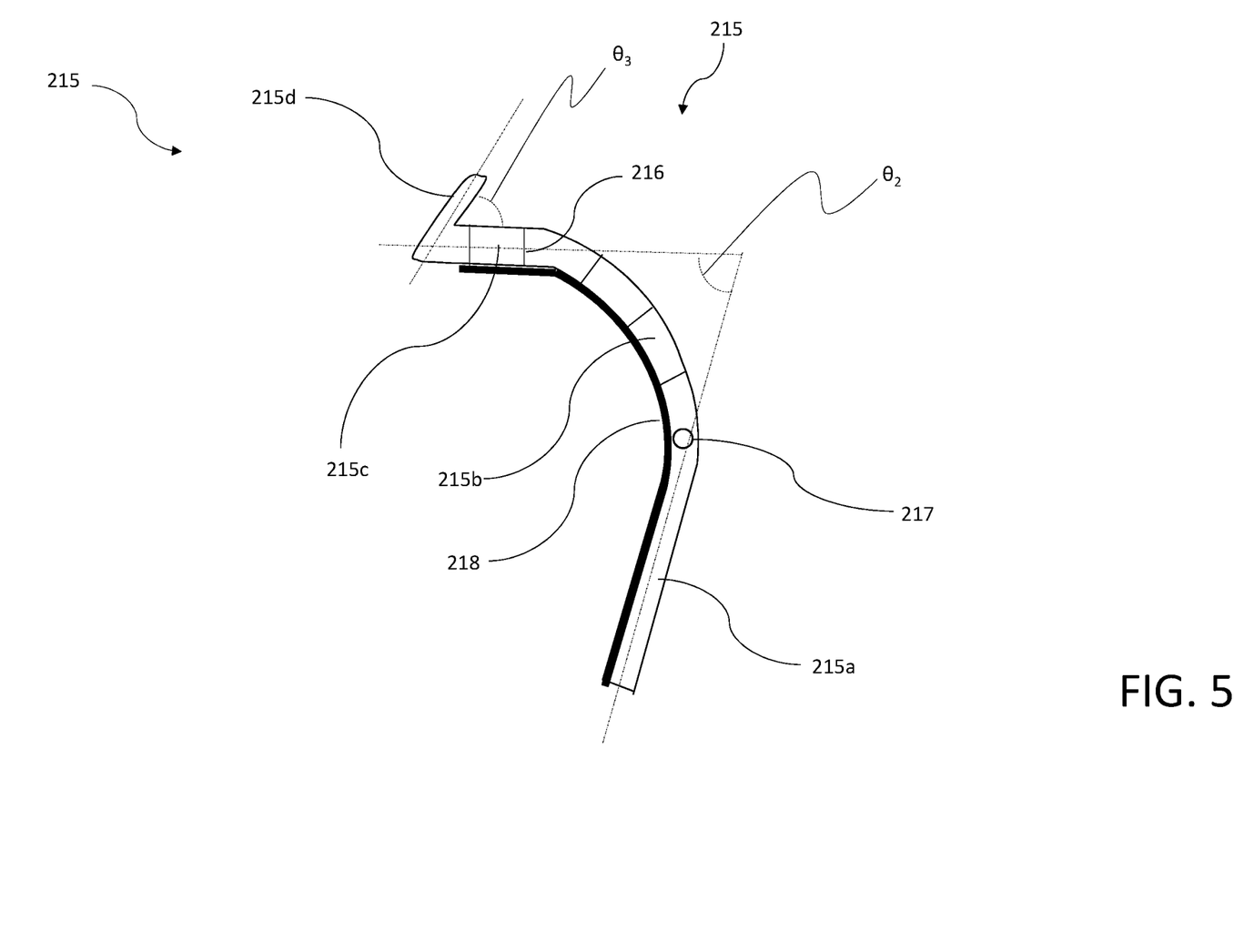
FIG. 5 is a side view of a hook member of an exemplary embodiment of a carrier attachment.

As shown in exemplary FIGS. 4 and 5, the locking portion 215 may include a first element 215a, a second element 215b and a third element 215c. One end of the second element 215b of the locking portion 215 is connected with one end of the first element 215a of the locking portion 215 and another end of the second element 215b of the locking portion 215 is connected with another end of the third element 215c of the locking portion 215. The reference $\theta_2$ indicates an angle between the first element 215a of the locking portion 215 and the third element 215c of the locking portion 215. $\theta_2$ may form such that an angle of $\theta_1$ and $\theta_2$ is less than 180 degrees.

The locking portion 215 may further include at least one of a holding element 216. In this embodiment, the locking portion 215 includes the holding elements 216 at both side of the third element 215c of the locking portion 215. The holding element 216 may include ridges as shown in FIG. 4. The locking portion 215 may further include a pivoting protrusion 217 which may be engaged with a pivoting recess 214.

Figure 6A:
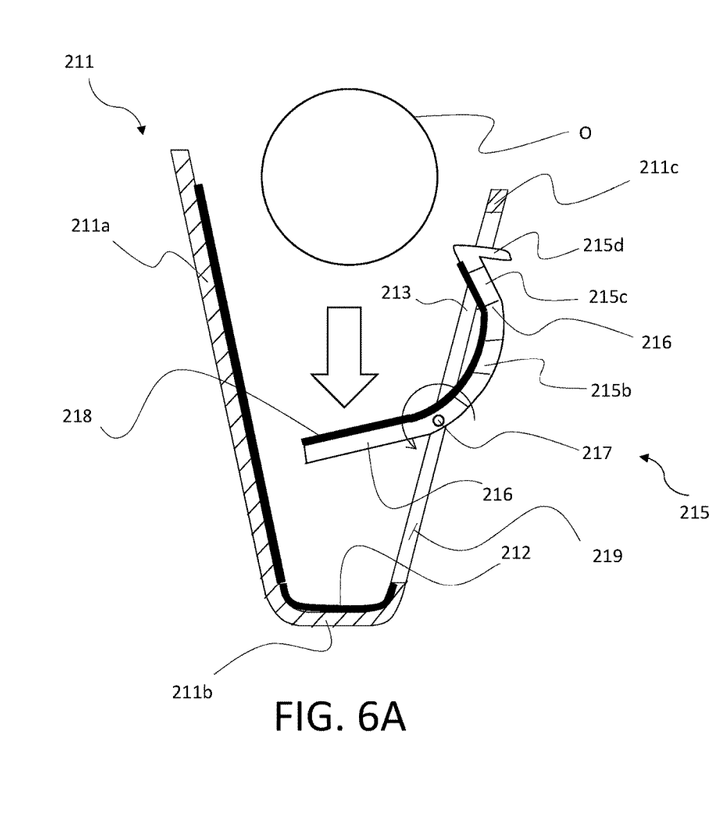
FIG. 6A is a first side view of another exemplary hook member of an exemplary embodiment of a carrier attachment.
Figure 6B:
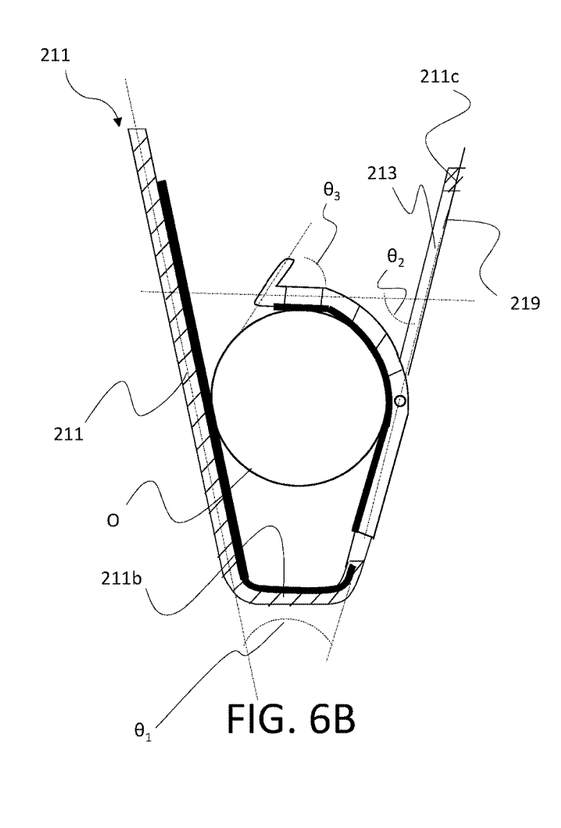
FIG. 6B is a second side view of another exemplary hook member of an exemplary embodiment of a carrier attachment.
Figure 7:
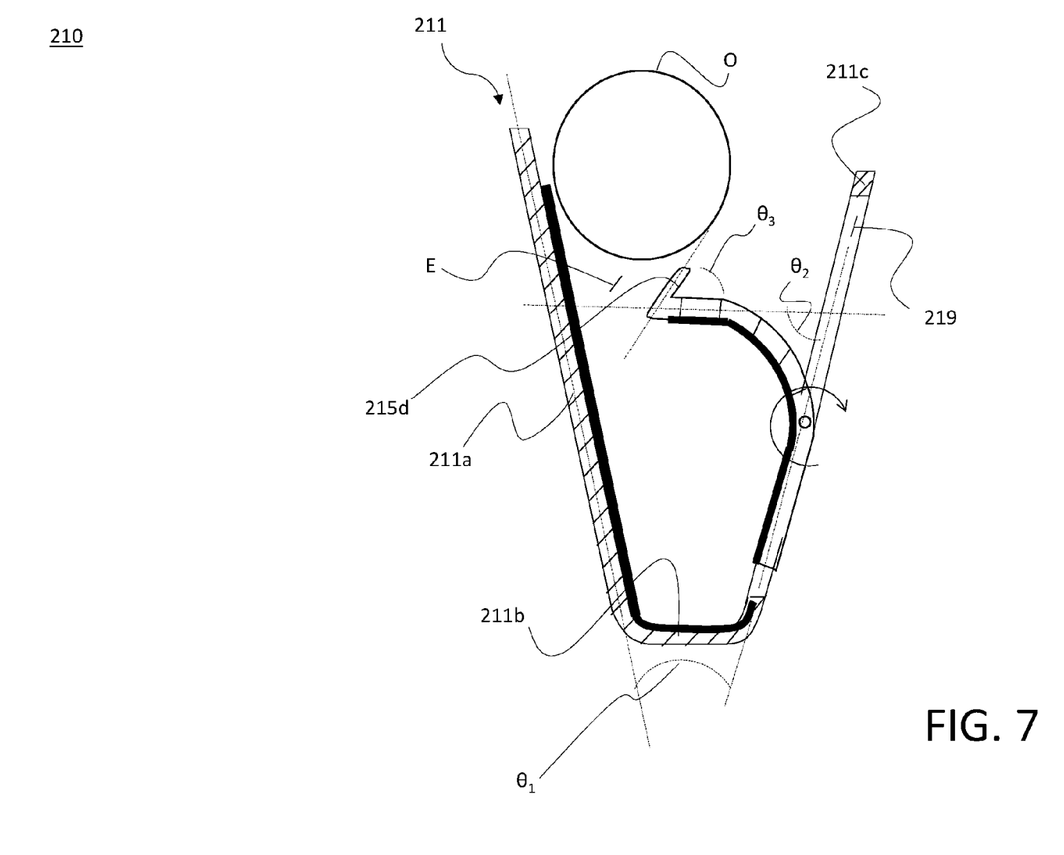
FIG. 7 is a side view of the hook member of FIG. 6.

Exemplary FIG. 6 illustrates a method to secure an object O according to an exemplary embodiment. The object O may be secured in an unload position as shown in FIG. 6A. In the unload position, the third element 215c of the locking portion 215 is away enough from the first portion 211a to receive the object O. Pushing the object O into the gap G of the hook member 210, the object O pushes the first element 215a of the locking portion 215, and the locking portion 215 is pivoted toward a locking position. As the locking portion 215 is pivoted relative to the third portion 211c, the holding elements 215a of the locking portion 215 is engaged with a side wall 213 of the third portion 211c. Thus, a force to push the object O may need to be significant enough to let the holding elements 215a run over the wall 213 of the third portion 211c. In the locking position, the third element 215c is adjacent to the first portion 211a and the object O is surrounded by the first portion 211a, the second portion 211b, the third portion 211c and the locking portion 215.

The locking portion 215 may be pivoted and be released from the locking position when an external force to pivot the locking portion is significant enough to let the holding elements 215a of the locking portion 215 run over the walls 213a of the third portion 211c. If a user pulls the object O with a force which exceeds the minimum force to let the locking portion 215 run over the walls 213a of the third portion 211c, the locking portion may be pivoted toward the unload position such that the third element 215c of the locking portion 215 is away from the first portion 211a of the hook member 210. According to the present invention, the tool can be secured in a stable manner even if the vehicle 10 moves or an unexpected external force is applied to either the vehicle 10, the career 100 or the object O.

Referring to exemplary FIGS. 4 to 7, the locking portion 215 may further include a guide 215d. The guide 215d may be connected with another end of the third element 215c of the locking portion 215. The reference $\theta_3$ indicates an angle between the guide 215d and the third element 215c of the locking portion 215. Preferably, $\theta_3$ is below than 90 degrees. Thus, the guide 215d of the locking portion 215 may help a user to secure the object O when the locking portion 215 is in the locking position. In the locking position, the guide 215d and the first portion 211a of the hook member 211 may form V-shape entrance which opens outwardly such that the object O moving into the hook member may widen the gap between the first portion 211a and the locking portion 215.

Figure 8:
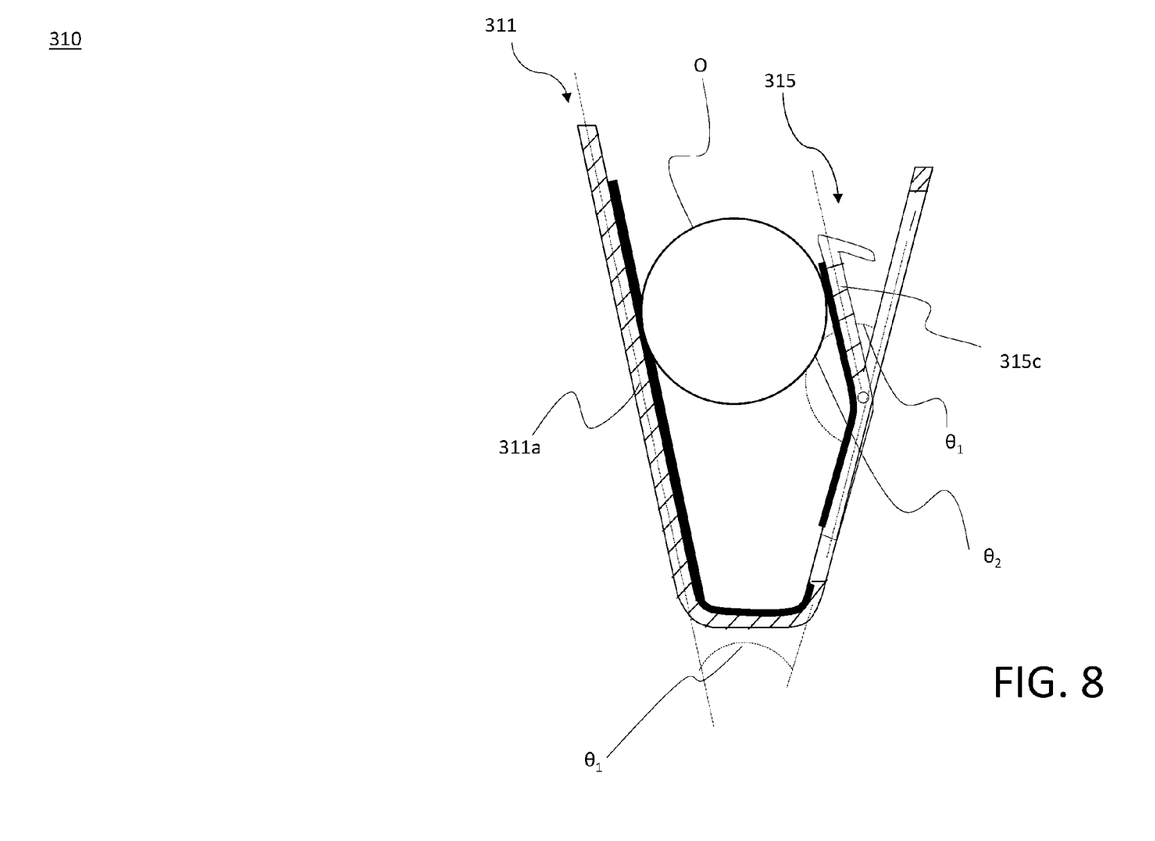
FIG. 8 is a side view of the hook member of FIG. 6.

As mentioned above and shown in FIG. 6B, the object O may be surrounded by the first portion 211a, the second portion 211b, the third portion 211c, and the locking portion 215 since $\theta_2$ may form such that an angle of $\theta_1$ and $\theta_2$ is less than 180 degrees. As shown in FIG. 8, if the angle $\theta_1$ and $\theta_2$ is 180 degrees, a first portion 311a of a base 311 of a hook member 310 is parallel with the third element 315c of the locking portion 315 so that the object O may be out of the hook member 310.

Another exemplary embodiment is described below. The other features described in the previous embodiments may be applied to this exemplary embodiment, as desired.

Figure 9:
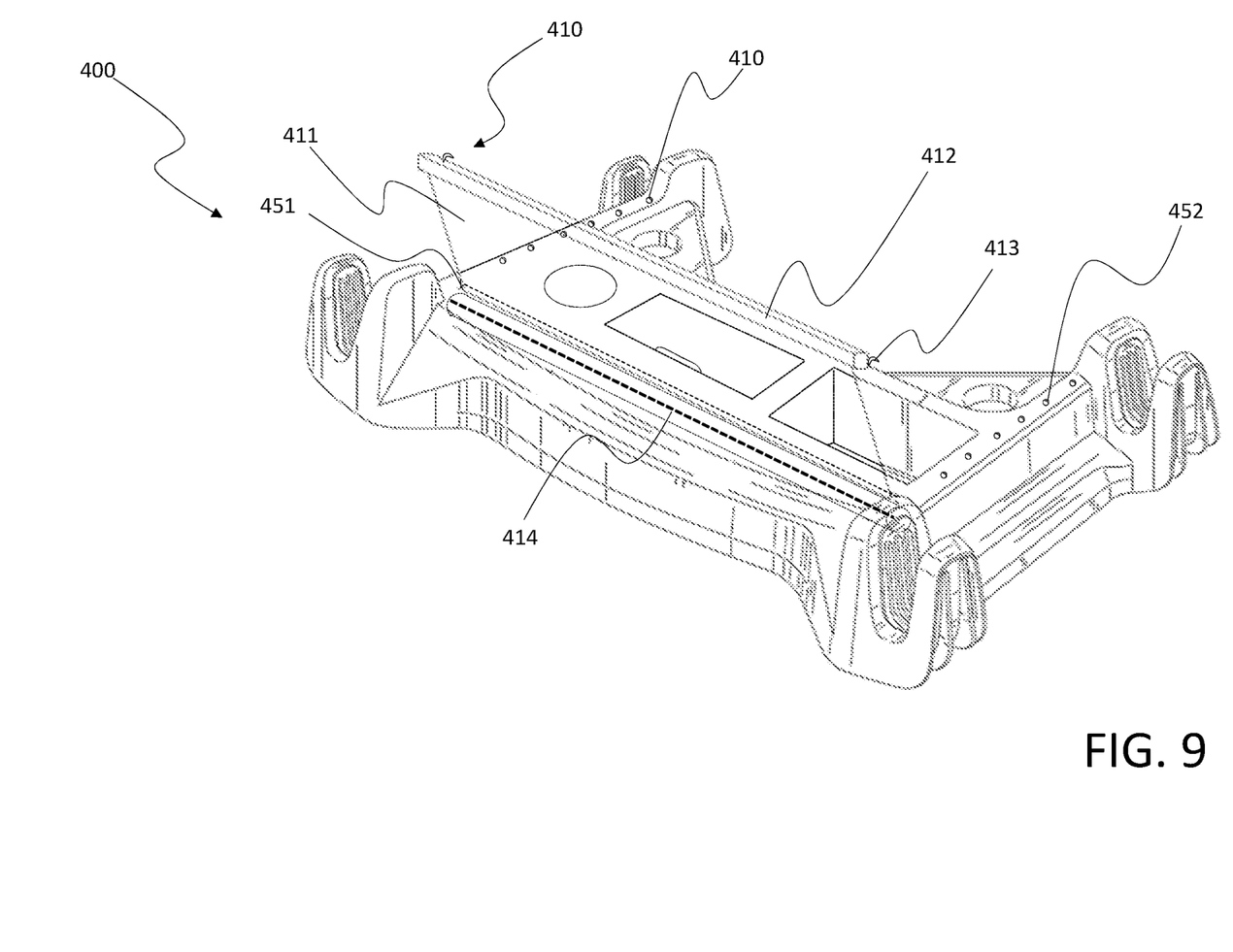
FIG. 9 is a front perspective view of another exemplary embodiment of a carrier attachment for a vehicle showing a cargo cover.

Referring to exemplary FIG. 9, the carrier 400 may further include a cover member 410. The cover member 410 may include a screen 411, a screen bar 412 and a screen holder 413. The reference 451 indicates an opening through which the screen 412 may be drown. In the exemplary embodiment, the opening 451 is placed the rear area of the carrier 400, however, it may be placed other place of the carrier 400.

As shown in the FIG. 9, the screen may be rolled around reel 414 and be placed inside the career 400. The screen 411 may receive the tension for winding up such that it remains rolled when no pulling force is applied. The screen may be made of plastic, rubber or fabric, or any other material, as desired.

The screen bar 412 is connected with a free end of the screen 411. The screen bar 412 may be made of various material, including plastic or rubber, as desired.

In the exemplary embodiment, the screen holder 413 may form a hook which can be engaged with one of holes 452 of the carrier 400. The carrier 400 may include the multiple holes 452 such that a user may decide an area which may be covered by the screen 411. However, the shape or dimension of the screen holder and the hole may be altered.

According to the present embodiment, a user may cover the compartments with the screen 411. When the user does not use the screen 411, the rolled screen 411 may be placed inside the career 400. The user may pull the screen bar 412 to draw the screen 411 through the opening 451. The user may choose an area of the career 400 she will cover and hook the screen holder 414 at the holes 452.

Figure 10:
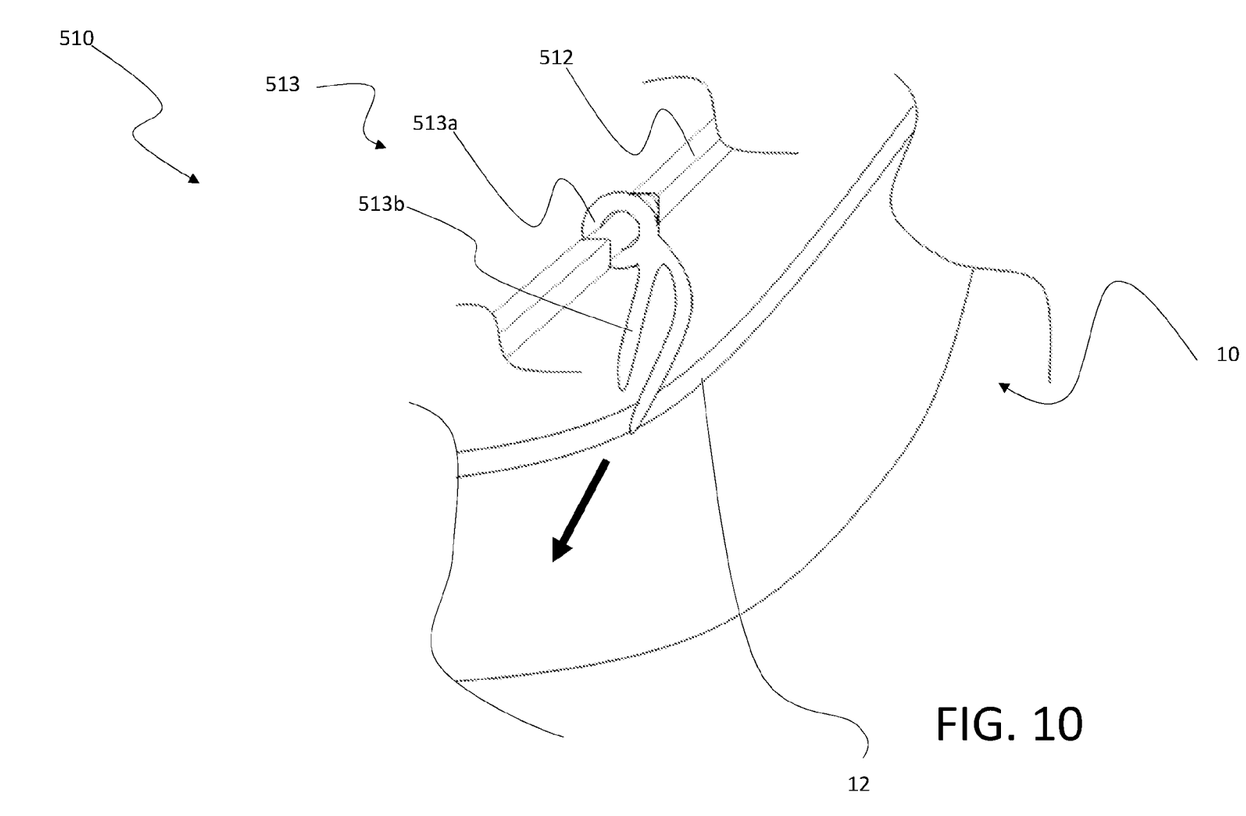
FIG. 10 is a side view of an attachment element of the cargo cover of FIG. 9.
Figure 11:
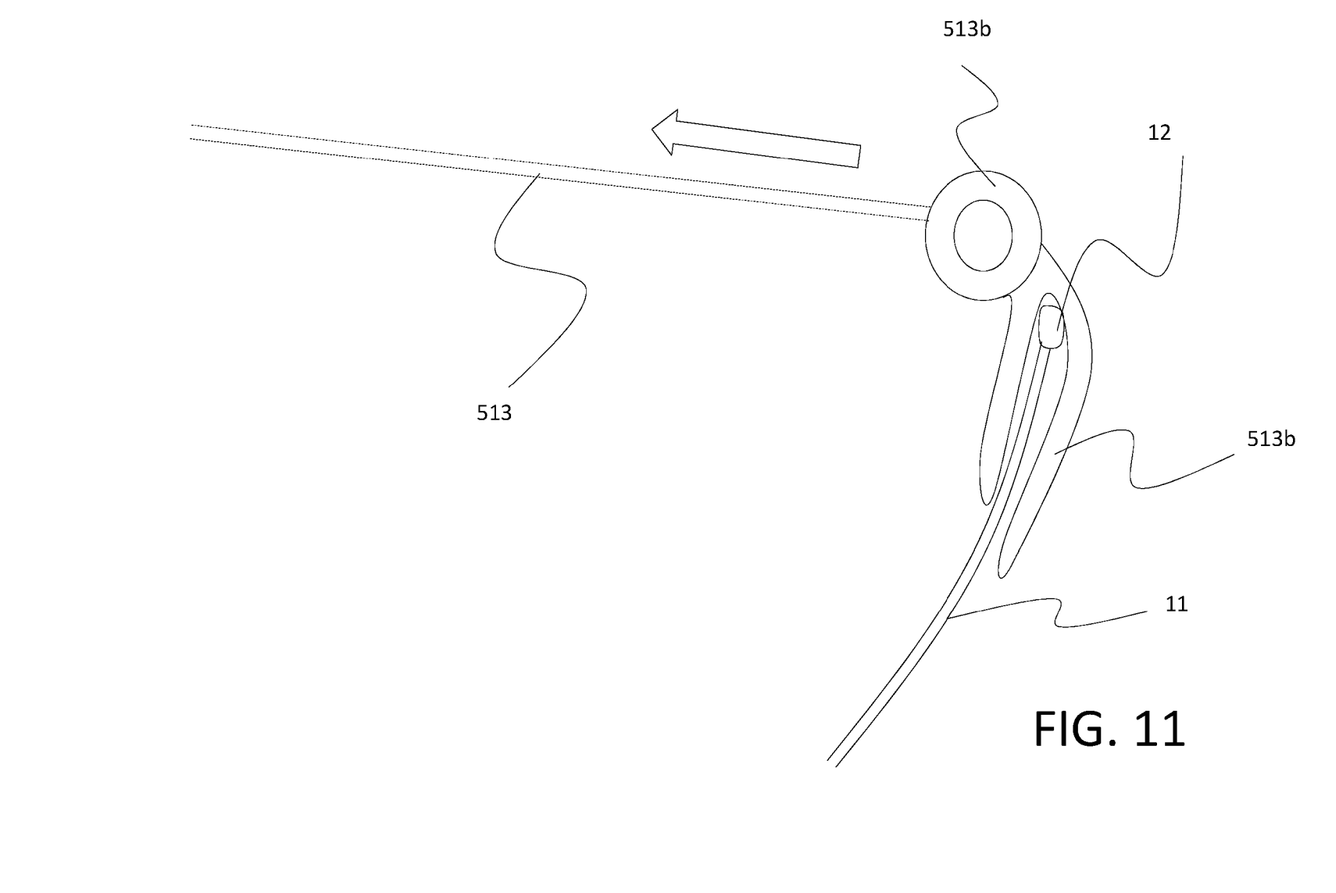
FIG. 11 is another side view of an attachment element of the cargo cover of FIG. 9.

Referring to exemplary FIGS. 10 and 11, a screen member 510 may further include an additional holder 513. The additional holder 513 may have a base 513a and a U-shaped holder 513b. A user may hook the U-shaped holder 513b at the rim 12 of the vehicle 10 such that the whole area of tub 12 can be covered with the screen 512. The base may be rotated around the screen bar 512 to facilitate to hook into the U-shaped holder.

According to the present embodiment, a user may secure various objects in either compartments of the career and the tub with the screen quickly. The screen may keep objects from moving or falling out and protect objects from rain or other unwanted material.

Figure 12:
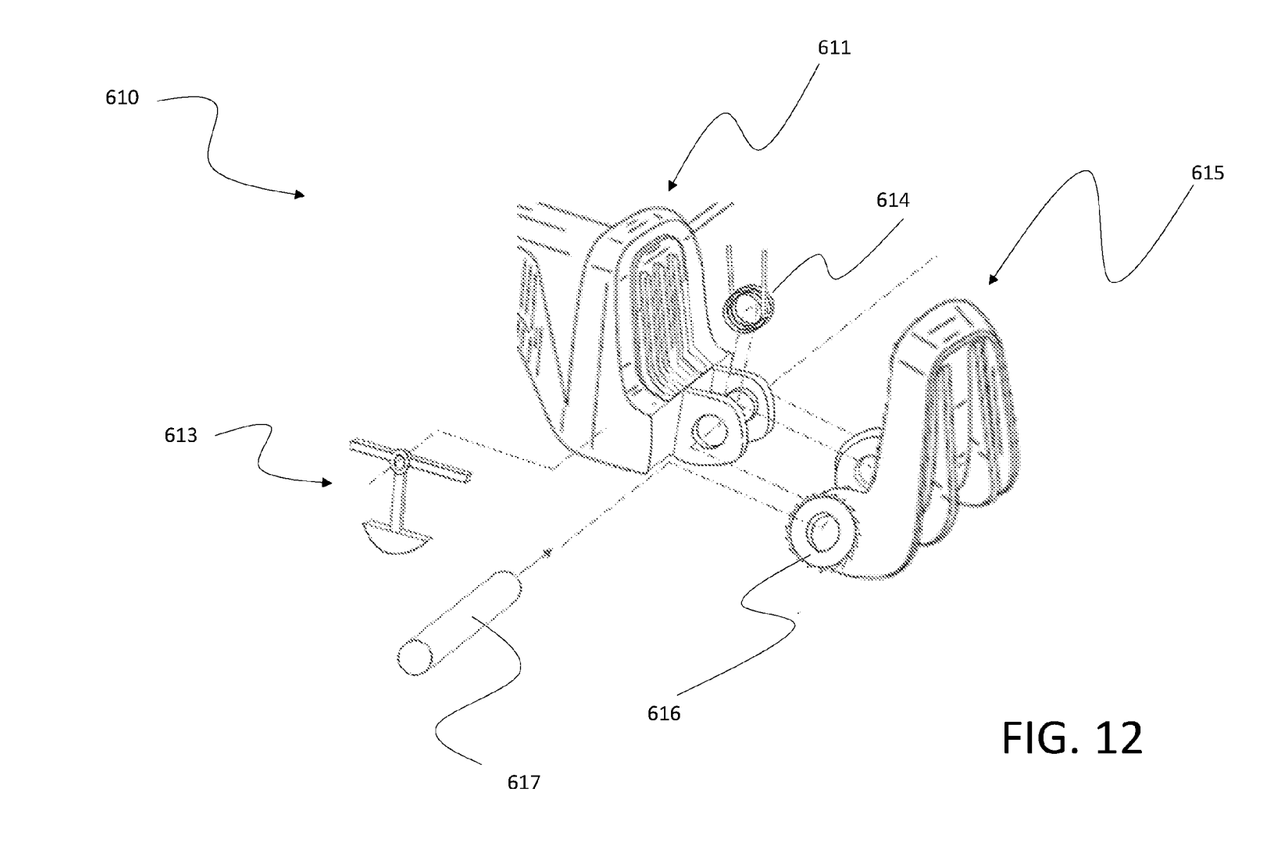
FIG. 12 is a side view of another exemplary hook member of an exemplary embodiment of a carrier attachment.
Figure 13A:
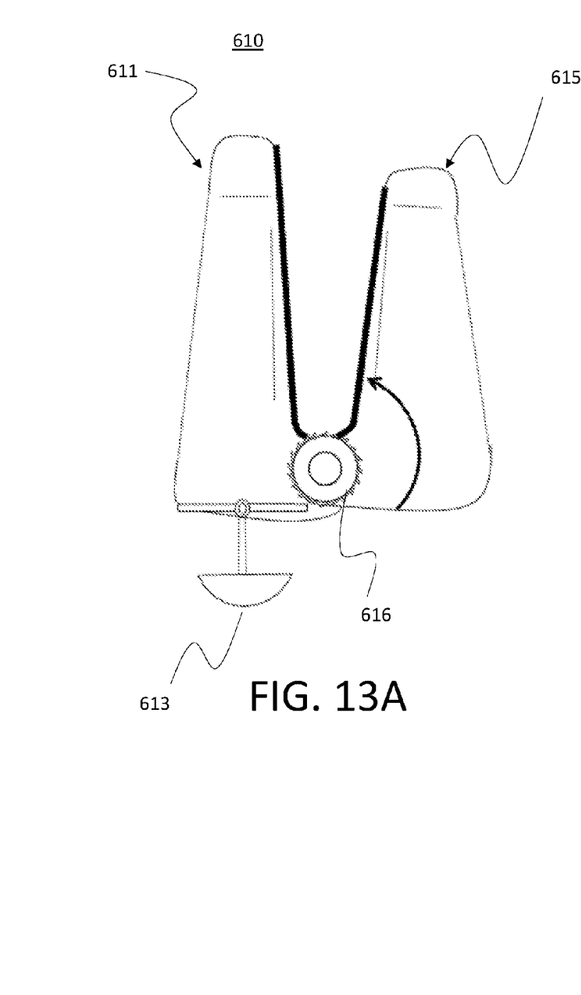
FIG. 13A is a side view of another exemplary hook member of an exemplary embodiment of a carrier attachment.
Figure 13B:
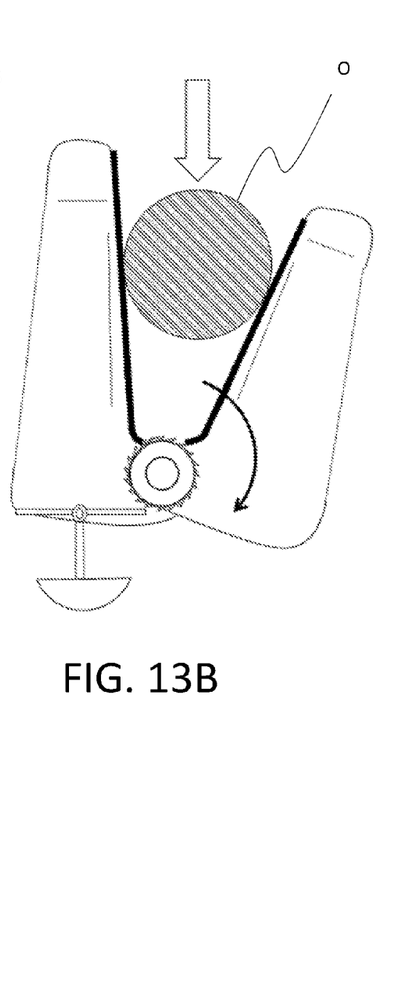
FIG. 13B is a side view of another exemplary hook member of an exemplary embodiment of a carrier attachment.
Figure 13C:
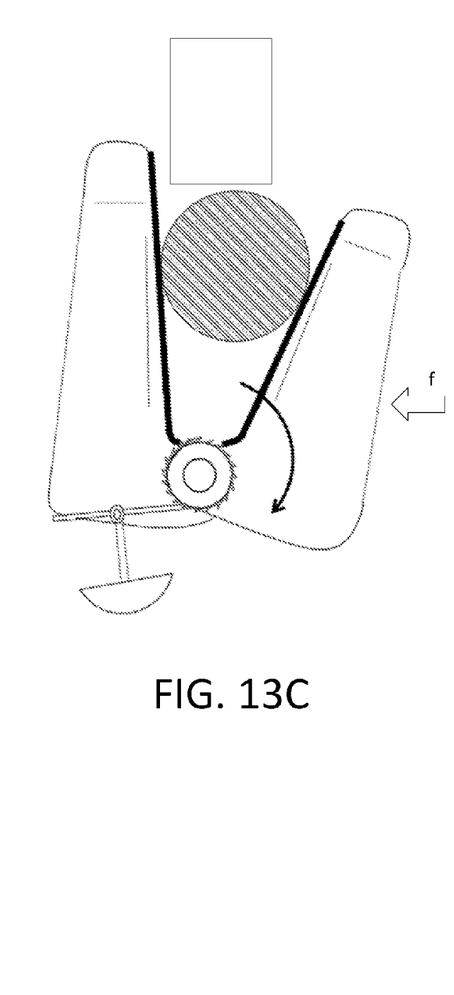
FIG. 13C is a side view of another exemplary hook member of an exemplary embodiment of a carrier attachment.

Referring to exemplary FIGS. 12 and 13, a hook member 610 may include a base 611 and a locking portion 615. The base is attached to the career 100. The locking portion 615 may be hinged on the base 611. The reference 617 indicates a torsion spring which provides a force to close the gap between the base 611 and the locking portion 615.

The hook member 610 may further include a pendulum 613 and a locking element 616. The pendulum 613 may be connected to the base 611 and swing freely when the vehicle 10 moves or the career receive the external impact. The locking element 616 is a sprocket. The locking element 616 is fixed to the locking portion 615 such that the locking element 616 pivots when the locking portion 615 pivots relative the base 611.

FIG. 13 illustrates the method to secure an object O with the hook member 610. As shown in FIGS. 13A and 13B, when there is no external force or impact, the pendulum 613 is in an unload position where the pendulum remains rest. Thus, the locking portion 615 may be pivoted freely when the force to pivot exceeds the strength of torsion spring 614 so that a user may push the object O into the hook member and secure the object O. The torsion spring provides the predetermined power to hold the object. A user may take out the object O from the hooking member 610 when a user pulls the object O with power exceeding the power of the torsion spring. In addition, according to the present invention, when the vehicle 10 moves or the external impact is applied to the career 100, as shown in FIG. 13C, the pendulum may swing and hold the locking element 616 such that the locking portion may not be pivoted and be locked.

Additionally, in further exemplary embodiments, there may be apertures disposed through the carrier to facilitate aligning the carrier when placing it on a vehicle. Further, a visual indicator with which to align a rim may be disposed proximate apertures. In some embodiments, the visual indicator may include a raised, dashed line.

In still other embodiments, the carrier may have any number of apertures therein that may facilitate drainage. Additionally, all of the compartments may be subdivided by vertical or horizontal dividing members. The walls of the various compartments may be sloped so as to facilitate settling objects toward a bottom surface of the compartments.

Further, the carrier may be formed such that it easily accommodates stacking and storage of multiple carriers on top of each other.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A carrier attachment apparatus for a vehicle comprising:
    at least one compartment to store an object therein;
    two or more securing portions disposed on an underside of the carrier attachment and configured to receive a rim of a tub, such that the carrier attachment can securely rest on the tub, the carrier attachment terminating proximate a first end of the tub and providing an open area between the first end of the tub and a second end of the tub that is greater than an area covered from the first end of the tub to the termination of the carrier attachment;
    at least one first hook member disposed on a first side of the carrier having a base and a locking portion; and
    at least one second hook member disposed on a second side of the carrier having a base and a locking portion;
    wherein the carrier attachment apparatus extends rigidly between the at least one first hook member and the at least one second hook member;
    wherein the compartment is provided between the at least one first hook member and the at least one second hook member, and
    wherein the locking portion of the at least one first hook member comprises a first element, a second element connected to the first element, and a third element connected to the second element, the locking portion further comprising a pivot disposed between the first element and the second element; and
    wherein the third element comprises a holding element.

2. The carrier attachment of claim 1, wherein the locking portion of the at least one first hook member and the at least one second hook member is an elastomeric substance.

3. The carrier attachment of claim 1, wherein the locking portion of the at least one first hook member and the at least one second hook member is pivotable relative to the base and includes a locking element.

4. The carrier attachment of claim 1, wherein the locking portion of the at least one first hook member and the at least one second hook member is pivotable between an unload position and a locking position, and wherein the locking element secures an object in the locking position.

5. The carrier attachment of claim 1, wherein the at least one compartment comprises a sealable section of the carrier attachment, and wherein the at least one compartment further comprises at least one closure configured to be shifted between a closed position and an open position and configured to seal the at least one compartment in the closed position.

6. The carrier attachment of claim 1, wherein the at least one compartment comprises a circular compartment and a sealable rectangular compartment.

7. The carrier attachment of claim 1, further comprising one or more securing elements that securely couple the carrier attachment to a carrier.

8. The carrier attachment of claim 6, wherein the sealable rectangular compartment further comprises a lid configured to be shifted between an open position and a closed position.

9. The carrier attachment of claim 8, wherein the lid is configured to interface with the sealable rectangular compartment such that a water-tight seal is created.

10. The carrier attachment of claim 1, wherein the base of the at least one first hook member comprises a first portion connected to the first side of the carrier, a second portion connected to the first portion at an angle to the first portion, and a third portion connected to the second portion at an angle to the second portion, the third portion further comprising an opening.

11. The carrier attachment of claim 1, wherein the locking portion of the at least one first hook member comprises a first element, a second element connected to the first element, and a third element connected to the second element, the locking portion further comprising a pivot disposed between the first element and the second element;
    wherein the third element comprises a holding element; and
    wherein the pivot is connected to the third portion of the base of the at least one first hook member such that the locking portion is configured to pivot within the opening.

12. A carrier attachment apparatus for a vehicle comprising:
- at least one compartment to store an object therein;
- two or more securing portions disposed on an underside of the carrier attachment and configured to receive a rim of a tub, such that the carrier attachment can securely rest on the tub, the carrier attachment terminating proximate a first end of the tub and providing an open area between the first end of the tub and a second end of the tub that is greater than an area covered from the first end of the tub to the termination of the carrier attachment;
- at least one first hook member disposed on a first side of the carrier having a base and a locking portion; and
- at least one second hook member disposed on a second side of the carrier having a base and a locking portion;
- wherein the carrier attachment apparatus extends rigidly between the at least one first hook member and the at least one second hook member;
- wherein the compartment is provided between the at least one first hook member and the at least one second hook member, and
- wherein the locking portion further comprises a guide element connected to the third element.

13. The carrier attachment of claim 1, further comprising a screen and a screen bar, the screen bar provided at a first end of the screen and the screen coupled to the carrier attachment at a second end of the screen opposite the first end; and
- wherein the screen is configured to extend over the at least one compartment.

14. The carrier attachment of claim 13, wherein the carrier attachment further comprises a plurality of screen couplings provided on each of the first side and the second side of the carrier; and
- wherein the screen bar is configured to interface with the plurality of screen couplings.

15. The carrier attachment of claim 13, wherein the screen bar further comprises a screen holder, the screen holder configured to interface with the rim of a tub.

16. The carrier attachment of claim 1, wherein the at least one compartment includes at least one dividing member.

17. The carrier attachment of claim 1, wherein the at least one compartment has at least one aperture defined therethrough.

18. The carrier attachment of claim 1, wherein the at least one compartment has sloped walls.

19. The carrier attachment of claim 1, wherein the at least one compartment further comprises a receiving track for a rim disposed on an underside of the at least one compartment.

* * * * *